(12) United States Patent
Dvorkovich et al.

(10) Patent No.: US 11,361,169 B2
(45) Date of Patent: Jun. 14, 2022

(54) METHOD AND SERVER FOR TRAINING A MACHINE LEARNING ALGORITHM FOR TRANSLATION

(71) Applicant: YANDEX EUROPE AG, Lucerne (CH)

(72) Inventors: Anton Aleksandrovich Dvorkovich, Moscow (RU); Boris Andreevich Kovarsky, Bratsk (RU)

(73) Assignee: YANDEX EUROPE AG, Lucerne (CH)

( * ) Notice: Subject to any disclaimer, the term of this patent is extended or adjusted under 35 U.S.C. 154(b) by 294 days.

(21) Appl. No.: 16/564,144

(22) Filed: Sep. 9, 2019

(65) Prior Publication Data
US 2020/0279022 A1    Sep. 3, 2020

(30) Foreign Application Priority Data
Feb. 28, 2019   (RU) ........................... RU2019105798

(51) Int. Cl.
*G06F 40/58*   (2020.01)
*G06N 3/04*    (2006.01)
*G06N 20/00*   (2019.01)

(52) U.S. Cl.
CPC .......... *G06F 40/58* (2020.01); *G06N 3/0454* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,268,684 B1 * | 4/2019 | Denkowski | G06F 40/58 |
| 10,963,784 B1 * | 3/2021 | Gauthier | G06F 40/211 |
| 2010/0286977 A1 * | 11/2010 | Chin | G06F 40/58 704/4 |
| 2012/0016655 A1 | 1/2012 | Travieso et al. | |
| 2015/0286629 A1 | 10/2015 | Abdel-Reheem et al. | |
| 2016/0306794 A1 | 10/2016 | Huang et al. | |
| 2020/0320984 A1 * | 10/2020 | Kuczmarski | G10L 15/005 |

FOREIGN PATENT DOCUMENTS

EP    1903456 A1    3/2008

* cited by examiner

*Primary Examiner* — Quynh H Nguyen
(74) *Attorney, Agent, or Firm* — BCF LLP

(57) ABSTRACT

Methods and servers for training a Machine Learning Algorithm (MLA) for translation of text are disclosed. The MLA has been trained using a first plurality of string pairs. The first plurality of string pairs has a natural proportion of string pairs of each context. The MLA is biased to generate the given parallel string as a translation of the respective string occurred in the main context. The method includes determining a second plurality of string pairs comprising a controlled proportion of string pairs of each context. The second plurality of string pairs are associated with labels indicative of the respective contexts. The method comprises re-training the MLA using the second plurality of string pairs and the respective labels. The MLA is re-trained to determine a given context of a given string and generate a respective parallel string as a translation having considered the given context.

18 Claims, 6 Drawing Sheets

METHOD AND SERVER FOR TRAINING A MACHINE LEARNING ALGORITHM FOR TRANSLATION

CROSS-REFERENCE

The present application claims priority from Russian Patent Application No. 2019105798, entitled "Method and Server for Training a Machine Learning Algorithm for Translation", filed Feb. 28, 2019, the entirety of which is incorporated herein by reference.

FIELD

The present technology relates to machine learning in general and, specifically, to a method and server for training a machine learning algorithm for translation.

BACKGROUND

With the growth of users accessing the Internet, a vast amount of Internet based services has surfaced. Such services include, for example, search engine services (such as Yandex™ and Google™ search engines, for example) that allow users to retrieve information by submitting queries to a search engine. Also, social network services as well as multimedia services enable a large variety of users with different social and cultural backgrounds to engage on unified platforms for exchanging content and information. Digital content and other information being exchanged amongst users may be in a variety of languages. For that reason, due to the ever-increasing amount of information being exchanged on the Internet, translation services such as Yandex.Translate™, for example, are often used.

The latter service has been particularly useful in allowing users to easily translate a text (or even a speech) from one language, which the user does not understand, into another one, which she does. This means that translation services are generally designed to provide a translated version of content in a language that the user understands to make that content intelligible for the user.

Despite the recent advances, conventional computer systems providing translation services still have many drawbacks. For example, typical machine translations are not well adapted to select a correct translation for a word in a specific context or with a particular meaning.

This inability to provide the correct/best translation renders translation services offered to users less desirable, which may affect user retention rates for Internet companies that provide these translation services.

SUMMARY

Developers of the present technology have appreciated certain technical drawbacks associated with the existing translation services. Conventional systems often provide translations of text to users. However, these translations may not be the correct/best translations. This is mainly due to the fact that a given word in a first language may be used in a variety of contexts and can thus have a variety of meanings. As a result, a variety of parallel words in a second language may potentially be used as translations for the given word.

Conventional systems may be well-suited for selecting some parallel word in the second language as a translation of the given word in the first language (thus providing a potentially acceptable translation) but are ill-suited for selecting the correct/best parallel word in the second language by taking into account/considering the context in which the given word in the first language has been used.

Developers of the present technology realized that many conventional translation systems are context agnostic. In other words, conventional translation systems are configured to generate a translation for a given word, without taking into account/considering the context in which the given word is used. However, such a translation is often undesirable for users since, in many cases, a translation of a given word that has been generated without considering the context in which it has been used, may be inadequate and/or confusing for the user that is trying to understand text in a foreign language.

Developers of the present technology have devised methods for re-training a Machine Learning Algorithm (MLA) for translating content from a first language to a second language. Developers of the present technology have realized that some MLAs are trained on a number of training examples, the majority of which have occurred in a main context. As a result, these MLAs are biased to generate translations of content as if it occurred in the main context.

Therefore, in accordance with some embodiments of the present technology, MLAs are re-trained based on another set of training examples that comprises a controlled proportion of training examples having occurred in respective contexts. Also, each training example may be labeled with a respective context in which it occurred so that the MLA may "learn" to associate a text with a respective context in which it has occurred. As a result, in some implementation of the present technology, this re-training may allow correcting or at least reducing the bias of the MLA that has been acquired during the initial training.

It is an object of the present technology to ameliorate at least some of the inconveniences present in the prior art.

In a first broad aspect of the present technology, there is provided a method of training a Machine Learning Algorithm (MLA) for translating a text string in a first language into a parallel text string in a second language. The method is executable by a server implementing the MLA. The server has access to training string pairs each having (i) a given text string in the first language and (ii) a given parallel text string in the second language. The training string pairs have occurred in respective contexts. The contexts comprise a main context and at least one auxiliary context. The MLA has been trained using a first plurality of training string pairs for determining a given parallel text string in the second language in response to a respective text string in the first language. The first plurality of training string pairs comprises a natural proportion of string pairs of each context. The MLA is biased to generate the given parallel text string as a translation of the respective text string having occurred in the main context. The method comprises determining, by the server, a second plurality of training string pairs for training the MLA. The second plurality of training string pairs comprises a controlled proportion of string pairs of each context. The training string pairs in the second plurality of training string pairs are associated with respective labels, and where the labels are indicative of the context of the respective training string pairs. The method comprises re-training, by the server, the MLA using the second plurality of training string pairs and the respective labels. The MLA is re-trained to determine a given in-use context of a given in-use text string and generate a respective in-use parallel text string as a translation of the given in-use text string having considered the given in-use context.

In some embodiments of the method, the natural proportion of string pairs of each context corresponds to proportion of string pairs of each context available from a plurality of network resources accessible via a communication network.

In some embodiments of the method, a given training text string having occurred in the main context comprises body content of a given network resource. Another given training text string having occurred in the at least one auxiliary context comprises at least one of:
footer content of the given network resource;
header content of the given network resource;
title content of the given network resource; and
navigation control content of the given network resource.

In some embodiments of the method, the natural proportion comprises a majority of training string pairs in the first plurality of training string pairs occurring in the main context.

In some embodiments of the method, the controlled proportion comprises the substantially equal proportions of training string pairs occurring in the main context and in each one of the at least one auxiliary contexts.

In some embodiments of the method, the MLA comprises an encoder portion dedicated for text strings in the first language and a decoder portion dedicated for text strings in the second language. The re-training the MLA comprises training, by the server, the encoder portion to generate, for (i) a training text string in the first language of a given training string pair from the second plurality of training string pairs and (ii) a respective label, an encoder output. The re-training the MLA comprises training, by the server, the decoder portion to generate, for (i) a training parallel text string in the second language of the given training string pair from the second plurality of training string pairs and (ii) the respective label, an decoder output. The re-training the MLA is done such that a similarity between the encoder output and of the decoder output is maximised.

In some embodiments of the method, the method further comprises receiving, by the server, a first in-use text string in the first language, and where the first in-use text string comprises a given word. The method further comprises receiving, by the server, a second in-use text string in the first language, and where the second in-use text string comprises the given word. The method further comprises executing, by the server, the MLA for generating a first parallel in-use text string in the second language based on the first in-use text string, and where the given word is translated into a first parallel word in the first parallel in-use text string. The method further comprises executing, by the server, the MLA for generating a second parallel in-use text string in the second language based on the second in-use text string, and where the given word is translated into a second parallel word in the second parallel in-use text string. If the MLA determines that the context of the first in-use text string is different from the context of the second in-use text string, the first parallel word and the second parallel word are different translations of the given word.

In some embodiments of the method, the re-training the MLA comprises using, by the server, an adaptation-limiting loss function for re-training the MLA. The adaptation-limiting loss function is configured to limit the adaptation of the MLA, which has been trained based on the first plurality of training string pairs, following the training of the MLA.

In some embodiments of the method, limiting adaptation of the MLA comprises limiting degradation of a quality of the translation of the given in-use text string having occurred in the main context.

In some embodiments of the method, the using the adaptation-limiting loss function comprises, during a given iteration of the re-training of the MLA:

computing, by the server, a teacher distribution for a given word during a translation by the MLA as trained before the re-training, and where the teacher distribution is indicative of probabilities of respective potential words being the translation of the given word as determined by the MLA as trained before the re-training;

computing, by the server, a student distribution for the given word during a translation by the MLA being re-trained, and where the student distribution is indicative of probabilities of respective potential words being the translation of the given word as determined by the MLA being re-trained during the given iteration;

computing, by the server, a cross-entropy value which is a first type of similarity measure between the student distribution and a ground-truth distribution, and where the ground-truth distribution is indicative of a correct translation of the given word occurred in the respective context;

computing, by the server, a divergence value which is a second type of similarity measure between the teacher distribution and the student distribution; and computing, by the server, a weighted sum of the cross-entropy value and of the divergence value, and where the weighted sum is a value of the adaptation-limiting loss function for the given word of the given iteration.

In a second broad aspect of the present technology, there is provided a server for training a Machine Learning Algorithm (MLA) for translating a text string in a first language into a parallel text string in a second language. The MLA is implemented by the server. The server has access to training string pairs each having (i) a given text string in the first language and (ii) a given parallel text string in the second language. The training string pairs have occurred in respective contexts. The contexts comprise a main context and at least one auxiliary context. The MLA has been trained using a first plurality of training string pairs for determining a given parallel text string in the second language in response to a respective text string in the first language. The first plurality of training string pairs comprises a natural proportion of string pairs of each context. The MLA is biased to generate the given parallel text string as a translation of the respective text string having occurred in the main context. The server is configured to determine a second plurality of training string pairs for training the MLA, where the second plurality of training string pairs comprises a controlled proportion of string pairs of each context. The training string pairs in the second plurality of training string pairs are associated with respective labels, and where the labels are indicative of the context of the respective training string pairs. The server is configured to re-train the MLA using the second plurality of training string pairs and the respective labels, where the MLA is re-trained to determine a given in-use context of a given in-use text string and generate a respective in-use parallel text string as a translation of the given in-use text string having considered the given in-use context.

In some embodiments of the server, the natural proportion of string pairs of each context corresponds to proportion of string pairs of each context available from a plurality of network resources accessible via a communication network.

In some embodiments of the server, a given training text string having occurred in the main context comprises body content of a given network resource, and wherein another given training text string having occurred in the at least one auxiliary context comprises at least one of:
footer content of the given network resource;
header content of the given network resource;

title content of the given network resource; and
navigation control content of the given network resource.

In some embodiments of the server, the natural proportion comprises a majority of training string pairs in the first plurality of training string pairs occurring in the main context.

In some embodiments of the server, the controlled proportion comprises the substantially equal proportions of training string pairs occurring in the main context and in each one of the at least one auxiliary contexts.

In some embodiments of the server, the MLA comprises an encoder portion dedicated for text strings in the first language and a decoder portion dedicated for text strings in the second language. To re-train the MLA the server is configured to train the encoder portion to generate, for (i) a training text string in the first language of a given training string pair from the second plurality of training string pairs and (ii) a respective label, an encoder output. To re-train the MLA the server is configured to train the decoder portion to generate, for (i) a training parallel text string in the second language of the given training string pair from the second plurality of training string pairs and (ii) the respective label, an decoder output. The encoder portion and the decoder portion are trained such that a similarity between the encoder output and of the decoder output is maximised.

In some embodiments of the server, the server is further configured to receive a first in-use text string in the first language, where the first in-use text string comprises a given word. The server is further configured to receive a second in-use text string in the first language, where the second in-use text string comprises the given word. The server is further configured to execute the MLA for generating a first parallel in-use text string in the second language based on the first in-use text string, where the given word is translated into a first parallel word in the first parallel in-use text string. The server is further configured to execute the MLA for generating a second parallel in-use text string in the second language based on the second in-use text string, where the given word is translated into a second parallel word in the second parallel in-use text string. If the MLA determines that the context of the first in-use text string is different from the context of the second in-use text string, the first parallel word and the second parallel word are different translations of the given word.

In some embodiments of the server, to re-train the MLA the server is configured to use an adaptation-limiting loss function for re-training the MLA. The adaptation-limiting loss function is configured to limit the adaptation of the MLA, which has been trained based on the first plurality of training string pairs, following the training of the MLA.

In some embodiments of the server, limiting adaptation of the MLA comprises limiting degradation of a quality of the translation of the given in-use text string having occurred in the main context.

In some embodiments of the server, to use the adaptation-limiting loss function, during a given iteration of the re-training of the MLA, the server is configured to:
  compute a teacher distribution for a given word during a translation by the MLA as trained before the re-training, where the teacher distribution is indicative of probabilities of respective potential words being the translation of the given word as determined by the MLA as trained before the re-training;
  compute a student distribution for the given word during a translation by the MLA being re-trained, where the student distribution is indicative of probabilities of respective potential words being the translation of the given word as determined by the MLA being re-trained during the given iteration;
  compute a cross-entropy value which is a first type of similarity measure between the student distribution and a ground-truth distribution, where the ground-truth distribution is indicative of a correct translation of the given word occurred in the respective context;
  compute a divergence value which is a second type of similarity measure between the teacher distribution and the student distribution; and
  compute a weighted sum of the cross-entropy value and of the divergence value, where the weighted sum is a value of the adaptation-limiting loss function for the given word of the given iteration.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
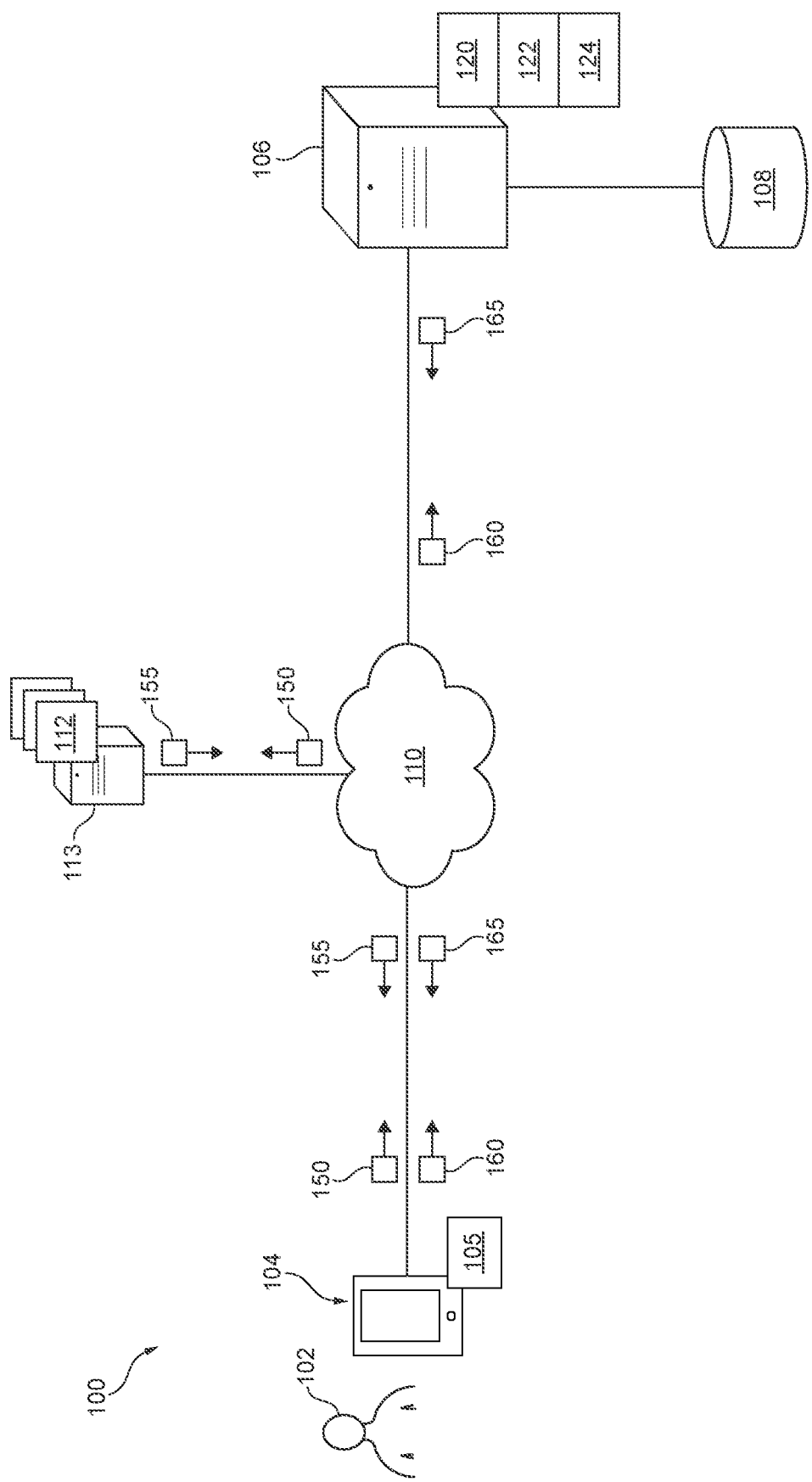
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide electronic translation services for a user 102 of an electronic device 104. For example, the system 100 may be configured to provide a translated version of at least a portion of a given network resource, such as a given web page (or portion thereof), for example, to the electronic device 104 for display thereof to the user 102.

For example, the user 102 may be desirous of appreciating content of a given web page. However, in some cases, the content on the given web page may be in a language that is foreign (non-comprehensible) to the user 102. In many such situations, it may be desirable to provide translation services to the user 102, which aid the user 102 in understanding the content being displayed thereto.

In some embodiments of the present technology, the translation services of the system 100 may be designed to provide a translated version of the content to the electronic device 104 for display to the user 102, and where the translated version is in a language that the user 102 understands. In other words, the translation services of the system 100 may be designed to provide a translated version of the content which is intelligible to the user 102.

In some embodiments, it is contemplated that the translated version of the content may be displayed to the user 102 by substituting the content being displayed to the user 102 with the translated version of that content. In other words, the content being displayed to the user in a foreign language may be replaced by the translated version thereof.

It should be noted that, in some cases, the system 100 may be configured to provide the electronic device 104 with a translated version of only the content that is being currently displayed to the user 102. For example, the electronic device 104 may be currently displaying to the user 102 only a portion of the given web page. Put anther way, only a portion of the content of the given web page may be currently displayed to the user 102.

In other words, in some embodiments of the present technology, the system 100 may allow providing a translated version of only the content that is currently being displayed to the user 102, as opposed to providing a translated version of all content of the given web page (including the currently non-displayed portion of the given web page).

In some embodiments, provision of a translation for only the currently displayed portion of the given web page may result in more efficient translation services as it reduces processing and/or networking loads on at least some components of the system 100, as it will be described in greater details herein further below.

In some cases, provision of a translation for only the currently displayed portion of the given web page may be satisfactory for the user using the translation services of the system 100. Indeed, in some cases, the user 102 may be satisfied with the translation of the currently displayed portion of the given web page and may decide not to parse through the currently non-displayed portion of the given web page.

In these cases, the ability of providing a translation for only the currently displayed portion of the given web page may allow avoiding unnecessary use of processing power of the system 100 for translating content of the given web page that is not parsed through by the user 102.

In other cases, however, the user 102 may decide to parse through the currently non-displayed portion of the given web page. As it will become apparent from the description below, the user 102 may decide to "scroll" the given web page, for example, thereby triggering the electronic device 104 to display another portion of the given web page. At that moment in time, the another portion of the given web page is displayed to the user 102. At that moment in time, the currently displayed portion is the another portion of the given web page and the translation services of the system 100 may allow providing a translation of the another portion of the given web page.

It can thus be said that, in some embodiments of the present technology, the system 100 may provide "dynamic" translation services for the user 102, in a sense that the system 100 may be configured to provide a translated version of content currently displayed to the user 102 as the user 102 parses or scrolls through the content.

It should be mentioned that, although some non-liming examples of the present technology will be described herein below with reference to translation of web page content, it should be understood that the translation services of the system 100 may be used in various other implementations where the content displayed to the user 102 by the electronic device 104 does not originate from a web page but from other types of network resources.

At least some components of the system 100 will now be described, however, it should be understood that other components to those depicted in FIG. 1 may be part of the system 100 without departing from the scope of the present technology.

Electronic Device

The system 100 comprises the electronic device 104, the electronic device 104 being associated with the user 102. As such, the electronic device 104 can sometimes be referred to as a "client device", "end user device", "client electronic device" or simply "device". It should be noted that the fact that the device 104 is associated with the user 102 does not need to suggest or imply any mode of operation—such as a need to log in, a need to be registered, or the like.

The implementation of the device 104 is not particularly limited, but as an example, the device 104 may be implemented as a personal computer (desktops, laptops, netbooks, etc.), a wireless communication device (such as a smartphone, a cell phone, a tablet and the like), as well as network equipment (such as routers, switches, and gateways). The device 104 comprises hardware and/or software and/or firmware (or a combination thereof), as is known in the art, to execute a browser application 105.

Generally speaking, the purpose of the browser application 105 is to enable the user 102 to access one or more network resources, such as web pages, for example. How the browser application 105 is implemented is not particularly limited. One example of the browser application 105 may be embodied as a Yandex™ browser.

Figure 5:
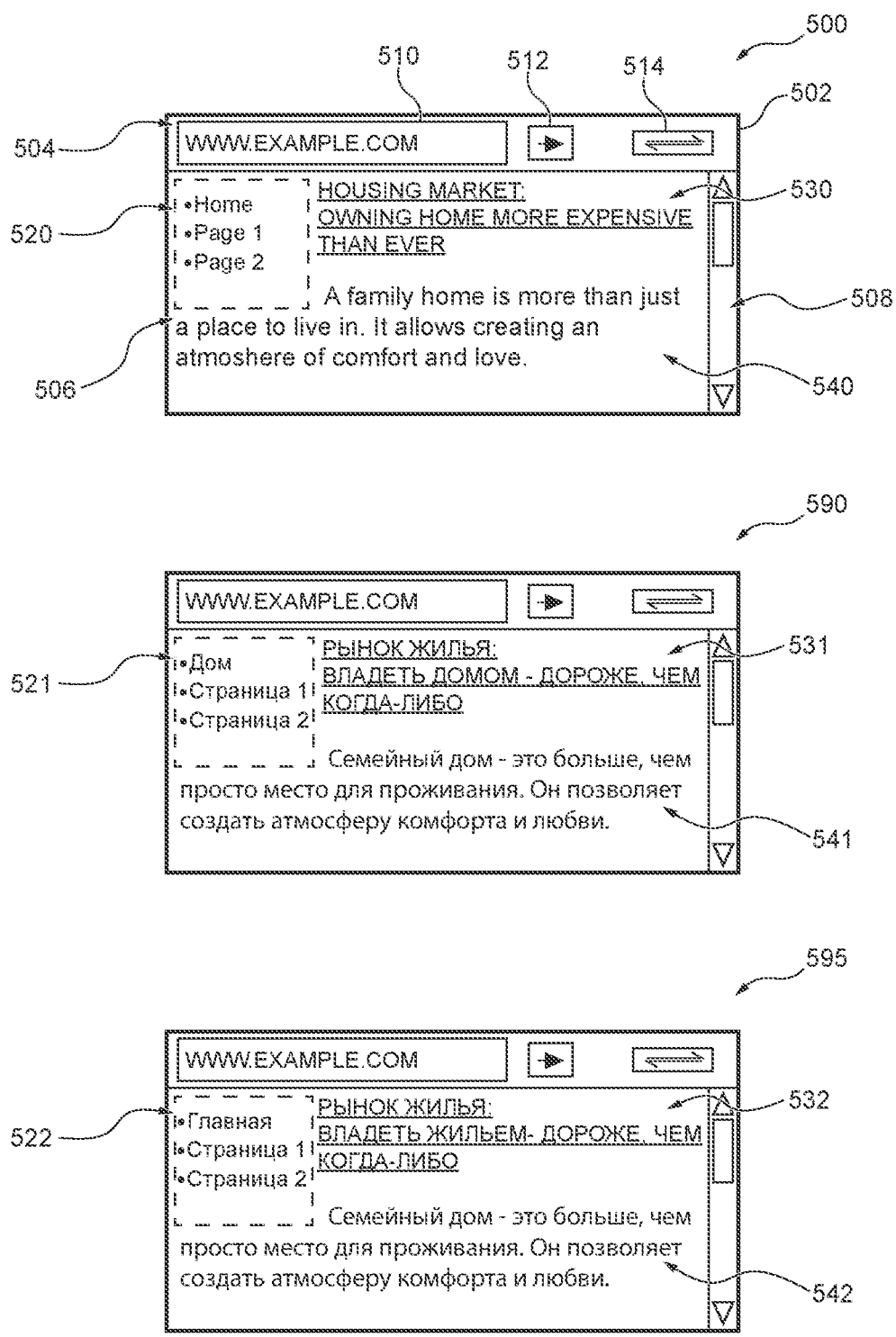
FIG. 5 depicts different representations of a browser window of the browser application of FIG. 1 in accordance with non-limiting embodiments of the present technology.

With a brief reference to a top portion of FIG. 5, there is depicted a non-limiting example of a representation 500 of a browser window 502 of the browser application 105 as displayed to the user 102 by the device 104. For example, the user 102 may trigger the device 104 to launch the browser application 105, thereby triggering the device 104 to display to the user 104 the browser window 500.

The browser window 500 includes a browse bar 504, a display pane 506 and a scroll bar 508. The browse bar 504 includes an address bar or omnibar 510, a go-to button 512 and a translation button 514. The address bar 510 may be used by the user 102 for entering an address of a desired network resource in the address bar 510. For example, the desired network resource may be a news web page having content that is desirable for the user 102. In the illustrated non-limiting example, the address is "www.example.com".

The user 102 may then actuate the go-to button 512 which triggers the browser application 105 to navigate to the desired network resource and display, in the display pane 506 of the browser window 502, at least some content of the desired network resource. For example, the display pane 506 displays content, some of which corresponds to a news story regarding the current housing market.

The user 102 may use the scroll bar 508 of the browser window 502 for scrolling through the content of the desired network resource, which results in the display plane 506 displaying additional content to the user 102 as the user 102 scrolls through it. For example, the user 102 may perform a "scroll-down" action by using the scroll bar 508, which results in additional content corresponding to the news story being displayed in the display pane 506.

It should be noted that the browser window 502 depicted in FIG. 5 is a simplified version of a browser window that may be displayed by the electronic device 104 to the user 102. Put another way, other or additional bars, panes, and/or buttons may be implemented as part of the browser window 502 being displayed to the user 102 by the electronic device 104, without departing from the scope of the present technology.

As previously mentioned, in this non-limiting example, the browser window 502 also includes the translation button 514. Upon actuation of the translation button 514, the browser application 105 may receive an explicit indication from the user 102 to employ translation services of the system 100. For example, the browser application 105 may employ translation services of the system 100 for translating information being currently displayed in the display pane 506 of the browser window 502.

In some embodiments, the browser application 105 may be configured to continue using the translation services of the system 100 until it receives an explicit indication from the user 102 to stop employing translation services of the system 100. For example, the user 102 may actuate the translation button 514 a second time, which provides the browser application 105 with the explicit indication to stop employing translation services of the system 100. Put another way, the translation button 514 may be implemented for providing a "translation mode on" and "a translation mode off" functionalities to the browser application 105.

In other embodiments, the browser application 105 may be configured to employ translation services of the system 100 until all currently displayed content in the display pane 506 is translated/replaced/substituted by the translated version thereof. Put another way, the translation button 514 may be implemented for providing "translation upon actuation" functionality to the browser application 105, in which the user 102 does not need to provide an explicit indication to the browser application 105 to stop employing translation services of the system 100.

Alternatively, the translation button 514 may be omitted and the browser application 105 may be configured to allow the user 102 to explicitly indicate which of the "translation mode on", "a translation mode off" and/or "translation upon actuation" functionalities are desirable for the user 102 via other means, such as via settings, for example, of the browser application 105.

Optionally, the browser application 105 may be configured to start/stop employing translation services of the system 100 without explicit indications from the user 102 to do so. For example, the browser application 105 may allow the user 102 to select a language of translation for translation purposes and, if the language of the content being displayed to the user 102 does not match this language of translation, the browser application 105 may be configured to start employing translation services of the system 100 without explicit indications from the user 102 to do so. Also, if the language of the content being displayed to the user 102 matches the language of translation, the browser application 105 may be configured to stop employing translation services of the system 100 without explicit indications from the user 102 to do so.

In some embodiments, the user 102 may manually select (in the settings, for example) the language of translation. Alternatively, the browser application 105 may be configured to "recognize" a preferred language for the user 102 for translation purposes based on browsing history of the user 102 and automatically elect the preferred language as the language of translation. For example, if the browsing history of the user 102 is indicative of the user 102 navigating mainly to network resources having information in Russian, the browser application 105 may be configured to (i) recognize that Russian is the preferred language of the user 102 and (ii) automatically elect Russian as the language of translation for translation purposes.

Returning to the description of FIG. 1, the browser application 105 of the electronic device 104 may enable the user 102 to navigate a plurality of network resources 112. In one non-limiting example, the plurality of network resources 112 may correspond to web pages hosted by one or more network servers 113.

For example, upon the user 102 providing indication of an address of a given one of the plurality of network resources 112, the browser application 105 may trigger the electronic device 104 to generate a resource request 150 destined to a given network server 113 hosting the given one of the plurality of network resources 112. The resource request 150 may take form of a data packet that comprises computer-readable instructions configured to request information from the given network server 113 hosting the given one of the plurality of network resources 112.

Also, the electronic device 112 is also configured to receive a resource response 155 originating from the given network server 113 hosting the given one of the plurality of network resources 112. The resource response 155 may take form of another data packet that comprises computer-readable instructions configured to allow the browser application 105 to display content of the given one of the plurality of network resources 112.

How resource requests 150 and resource responses 155 may be transmitted between the electronic device 104 and the one or more network servers 113, how the plurality of network resources 112 are implemented and what type of information may be transmitted via the resource responses 155 in response to the resource requests 150 will now be described in turn.

Communication Network

The device 104 is communicatively coupled to a communication network 110 for accessing the one or more network servers 113 hosting the plurality of network resources 112. For example, the device 104 may be communicatively coupled with the one or more network server 113 via the communication network 110 for providing the user 102 with the content of the plurality of network resources 112.

It is contemplated that the device 104 is also communicatively coupled to the communication network 110 for accessing a server 106. For example, the device 104 may be communicatively coupled with the server 106 via the communication network 110 for providing the user 102 with the translation services mentioned above.

In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

The communication network 110 is configured to transmit inter alia the resource requests 150 from the device 104 to the respective ones of the one or more network servers 113 and the resource responses 155 from the respective ones of the one or more network servers 113 to the device 104.

It is also contemplated that the communication network 110 is configured to transmit inter alia server requests 160 from the device 104 to the server 106 and the server responses 165 from the server 106 to the device 104. Although the purpose and content of the server requests 160 and of the server responses 165 will be described in greater detail herein further below, generally speaking, the server requests 160 and the server responses 165 may be used for enabling the translation services mentioned above.

Plurality of Network Resources

A given network server amongst the one or more network servers 113 can be implemented as a conventional computer server. In an example of an embodiment of the present technology, the given network server can be implemented as a Dell™ PowerEdge™ Server running the Microsoft™ Windows Server™ operating system. Needless to say, the given network server can be implemented in any other suitable hardware, software, and/or firmware, or a combination thereof.

Generally speaking, the one or more network servers 113 are configured to host the plurality of network resources 112. In some embodiments of the present technology, each of the plurality of network resources 112 may be implemented as a respective web page hosted by a respective one of the one or more network servers 113. Also, a given one of the one or more network servers 113 may host one or more of the plurality of network resources 112. For example, the given one of the one or more network server 113 may host a website including more than one of the plurality of network resources 112.

When the user 102 provides the address of the desired network resource via the browser application 105, the electronic device 104 transmits the respective resource request 150 to a respective network server 113 hosting the desired network resource (e.g., being amongst the plurality of network resources 112). This resource request 150 comprises computer-readable instructions for retrieving a given electronic document from the respective network server 113, and where the given electronic document comprises content to be displayed to the user 102 via the browser application 105.

The nature of the electronic document is not particularly limiting but, for sake of illustration only, the given electronic document may be representative of a given web page (e.g., the desired network resource) that is hosted by the respective network server 113. For example, the given electronic document may be written in a markup language such as HTML, XML and the like.

Therefore, it can be said that the purpose of the resource request 150 is to instruct a given network server to provide the electronic device 104 with a given electronic document that comprises content to be displayed to the user 102 via the browser application 105.

In response to the respective resource request 150, the respective network server 113 transmits the resource response 155 to the electronic device 104. The resource response 155 comprises the given electronic document. Therefore, it can be said that the purpose of the resource response 155 is to transmit data representative of the given electronic document to the electronic device 104.

Generally speaking, the given electronic document being representative of a given web page (e.g., the desired network resource) is indicative of (i) what content is to be displayed by the browser application 105 to the user 102, and (ii) how this content is to be displayed by the browser application 105 to the user 102. Put another way, the given electronic document is indicative of (i) the content of the given web page that is to be displayed by the browser application 105 to the user 102, and (ii) rendering instructions for instructing the browser application 105 as to how the content of the given web page is to be displayed on the electronic device 104.

Figure 2:
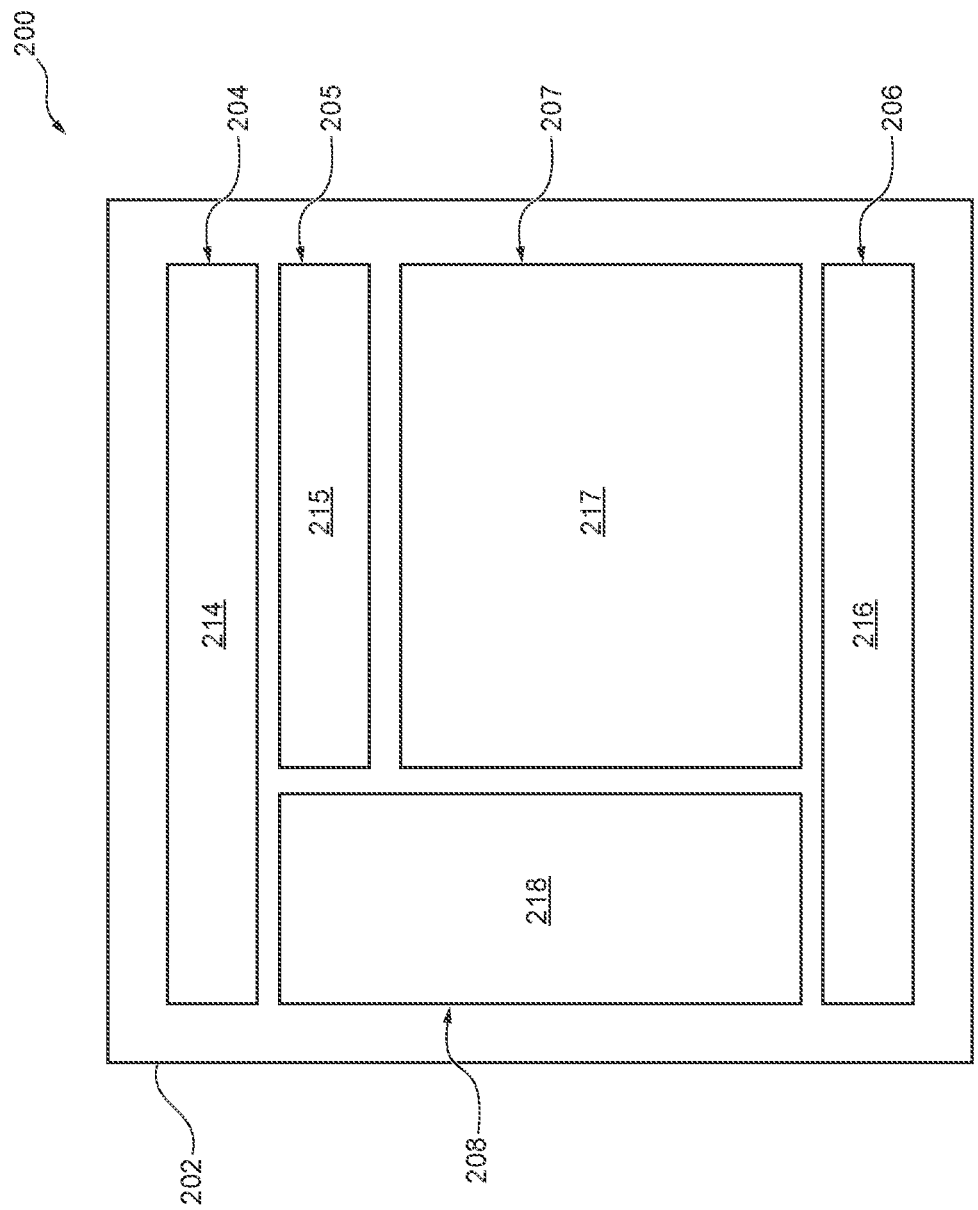
FIG. 2 depicts representation of a web page as it would be displayed by a browser application of FIG. 1 in accordance with non-limiting embodiments of the present technology.

With reference to FIG. 2, there is depicted a representation 200 of a given web page (e.g., a given one of the plurality of network resources 112) as it would be displayed by the browser application 105 in accordance with the respective rendering instructions. The representation 200 includes a rendered version 202 of the given web page.

The rendered version 202 comprises (i) a header section 204, (ii) a title section 205, (iii) a footer section 206, (iv) a body section 207, and (v) a navigation control section 208.

It should be noted that a rendered version of a given web page may have less sections or additional sections to those non-exhaustively depicted as part of the rendered version 202, without departing from the scope of the present technology.

It should be noted that each one of the (i) the header section 204, (ii) the title section 205, (iii) the footer section 206, (iv) the body section 207, and (v) the navigation control section 208, displays respective content of the given web page. Information regarding which content is to be displayed in which section of the rendered version 202 is included in the electronic document representing the given web page. This information may be processed by the browser application 105 during the rendering process of the given web page.

For example, (i) header content 214 of the given web page is displayed in the header section 204, (ii) title content 215 of the given web page is displayed in the title section 205, (iii) footer content 216 of the given web page is displayed in the footer section 206, (iv) body content 217 of the given web page is displayed in the body section 207, and (v) navigation control content 218 of the given web page is displayed in the navigation control section 208.

For example, the header content 214 typically includes content listed at the top of a given web page such as logos, slogans, and the like, of an entity operating the given web page. In some implementations of the given web page, the header content 214 may comprise image files.

The title content 215 typically includes a snippet that generally describes the subject to which the given web page pertains. For example, if the given web page pertains to a news story, the title content 215 may include a snippet that generally describes that news story. This snippet included in the title content 215 may be a text string that, in some cases, does not respect grammatical rules, or may comprise exclusively capitalized characters, for example.

The footer content 216 typically includes content listed at the bottom of a given web page such as information regarding terms of use, feedback, user agreements, help services and the like. For example, the footer content 216 may comprise legal phraseology and/or hyperlinks that include legal phraseology.

The navigation control content 218 typically includes a number of navigation buttons/hyperlinks that are displayed to the user 102 with the purpose of aiding the user 102 in navigating the website associated with the given web page and/or additional websites and/or additional web pages associated with the given web page. For example, in some cases, the hyperlinks that are displayed to the user 102 as part of the navigation control content 218 may be linked with an address that is at least partially the same as the address of the given web page. This is especially the case when these hyperlinks are displayed with the purpose of redirecting the user 102 from the given web page of a website to other web pages of the website.

The body content 217 typically includes the main content of the given web page that the user 102 may be desirous of appreciating. For example, if the given web page pertains to a news story, the body content 217 is likely to include a text that describes in detail the news story. The body content usually includes a multitude of sentences that generally respect grammatical rules and are composed of logically organized, full sentences. In most cases, the body content is much more respectful of grammatical rules, when compared to the title or snippet portions of the web site. The body content may also include images or type of content other than text strings.

It should also be noted that the body content 217 usually includes the majority of content of the given web page. Put another way, the proportion of body content 217 to the totality of content of the given web page is typically higher than the proportion of any one of the header content 214, the title content 215, the footer content 216, and the navigation control content 218 to the totality of content of the given web page.

It should be appreciated from the above that, depending on the section of the given web page in which a given content is included, the given content may have a different meaning. To better illustrate this, let it be assumed that both the body content 217 and the navigation control content 218 have the word "Home". Put another way, let it be assumed that the word "Home" is displayed (i) in the body section 207 of the given web page, and (ii) in the navigation control section 208 of the given web page.

In this example, the word "Home" used in the context of the body section 207 may potentially have a different meaning than the word "Home" used in the context of the navigation control section 208. For example, the word "Home" used in a body context (occurring in the body section 207) could mean or refer to living quarters, whereas the word "Home" used in a navigation control context (occurring in the navigation control section 208) could mean or refer to a home page or main page of a website.

Therefore, it can be said that the meaning of a word or a phrase depends on the context in which it is used or occurs. As a result, a given word or phrase used in a first context (occurring in a first given section of the given web page) may have a different meaning from an identical word or phrase used in a second context (occurring in a second given section of the given web page). Put another way, a given word or phrase may be used in different context that are specific to the respective sections of the given web page and, therefore, the given word or phrase may have different meanings depending on which section includes the given word or phrase.

In the above example, although in English (i) a main page of a website, and (ii) living quarters may both be referred to via the word "Home", in another languages, such as in Russian, for example, this might not be the case. For example, in Russian, the word that refers to the main page of a website and the word that refers to living quarters are completely different words. As a result, (i) choosing the correct/best word in the Russian language for translating "Home" when used in the navigation control context, while also (ii) choosing the correct/best word in the Russian language for translating "Home" when used in the body context, is a difficult task.

As it will be described in greater details herein further below, the developers of the present technology have devised systems and methods that allow the translation services provided to the user 102 to correctly/better choose a translated version of a given content (e.g., text, word(s), phrase(s), sentence(s), and the like) in view of the context in which the given content is used or occurs on the given web page. With reference to the above example, this means that the translation services as contemplated in the context of the present technology may allow (i) choosing the correct/best word in the Russian language for translating "Home" when used in the navigation control context, while also (ii) choosing the correct/best word in the Russian language for translating "Home" when used in the body context.

Server and Database

Returning to the description of FIG. 1, the system 100 also comprises the server 106 that can be implemented as a conventional computer server. It is contemplated that the server 106 may be implemented in a similar manner as a given network server of the one or more network servers 113, without departing from the scope of the present technology.

In the depicted non-limiting embodiments of the present technology, the server 106 is a single server. In alternative non-limiting embodiments of the present technology, functionalities of the server 106 may be distributed and may be implemented via multiple servers. The server 106 may include one or more processors, one or more non-transitory memory devices, computer-readable instructions, and/or additional hardware components, additional software components, and/or combination thereof, for implementing various functionalities of the server 106, without departing from the scope of the present technology.

The system 100 also comprises a database 108 which is communicatively coupled to the server 106 and is configured to store information extracted or otherwise determined or generated by the server 106. Generally speaking, the database 108 may receive data from the server 106 which was extracted or otherwise determined or generated by the server 108 during processing for temporary and/or permanent storage thereof and may provide stored data to the server 106 for use thereof. It is contemplated that the database 108 may be split into several distributed databases without departing from the scope of the present technology. What data the database 108 may receive from and/or provide to the server 106 will become apparent from the description herein below.

Generally speaking, the server 106 can be under control and/or management of a translation service provider (not depicted), such as, for example, an operator of Yandex™ translation services. It is contemplated that the provider of the translation services and the provider of the browser application 105 may be the same provider. For example, the browser application 105 (e.g., Yandex™ browser) and the translation services (e.g., Yandex™ translation services) may be provided, controlled and/or managed by the same operator or entity.

The server 106 is configured to execute a crawler application 120. Generally speaking, the crawler application 120 is configured to "visit" network resources available over the communication network 110 (such as the plurality of network resources 112 and/or other potential network resources, for example) and download them for further processing. For example, the crawler application 120 may access various network servers (such as the one or more network server 113 and/or other potential network servers, for example) and retrieve electronic documents representative of web pages (e.g., network resources) hosted by the various network servers.

It is contemplated that, in some embodiments of the present technology, the crawler application 120 may be configured to download electronic documents corresponding to various versions of a given web page. More particularly, each version of a given web page may comprise content of the given web page in a respective language. Many web pages that are available on the Internet today have versions thereof for satisfying users speaking different languages.

As one example, a banking institution usually provides a plurality of versions of a given web page where content of each version is in a respective language. For instance, a first version of the given web page provided by the banking institution may comprise content in English for satisfying English-speaking clients, while a second version of the given web page provided by the banking institution may comprise content in Russian for satisfying Russian-speaking clients. Therefore, in this instance, the crawler application 120 may be configured to download the electronic document representative of the English version of the given web page and the electronic document representative of the Russian version of the given web page.

As another example, a governmental institution may provide a plurality of versions of a given web page where content of each version is in a respective language. This is especially the case of governmental institutions of countries having more than one official languages, such as Canada, for example. For instance, a first version of a given web page provided by the governmental institution of Canada may comprise content in English for satisfying English-speaking residents, while a second version of the given web page provided by the governmental institution of Canada may comprise content in French for satisfying French-speaking residents. Therefore, in this instance, the crawler application 120 may be configured to download the electronic document representative of the English version of the given web page and the electronic document representative of the French version of the given web page.

It is contemplated that the server 106 may be configured to store the electronic documents downloaded by the crawler application 120 in the database 108. In some embodiments, it is contemplated that the server 106 may be configured to store the electronic documents in a grouped manner—that is, the electronic documents stored in the database 108 may be grouped or otherwise identified in the database 108 so as to indicate which electronic documents are associated with respective versions of a single web page.

In some embodiments of the present technology, the server 106 may also execute a string alignment application 122. Generally speaking, the string alignment application 122 may be used by the server 106 for building a corpus of parallel texts, the parallel texts having text strings having in different languages. The server 106 may execute the string alignment application 122 for the stored versions of a given web page in order to identify and extract parallel text strings from the content of different versions of the given web page.

For example, if a given web page is available in an English version and in a Russian version, the string alignment application 122 may be configured to identify and extract (i) given texts strings from the content of the English version of the given web page and (ii) given parallel texts strings from the content of the Russian version of the given web page.

In the context of the present specification, a given text string in a first language is a given parallel text string to another given text string in a second language when the given text string in the first language is a translation of the another given text string in the second language.

In order to better illustrate this, reference will be made to FIG. 3 that depicts a corpus 300. Let it be assumed that the corpus 300 is build by the server 106 for English-Russian text string pairs. However, it should be noted that the server 106 may be configured to build a corpus of text string pairs for any other pair of languages other than the English-Russian pair of languages in a similar manner as the corpus 300 without departing from the scope of the present technology.

The corpus 300 comprises a plurality of text string pairs 302. The plurality of text string pairs 302 comprises a first plurality of text strings 304 being in a first language (in this case, in English) and a second plurality of text strings 306 being in a second language (in this case, in Russian). The first plurality of text strings 304 and the second plurality of text strings 306 form the plurality of text string pairs 302 such that each one of the plurality of text string pairs 302 has a given text string from the first plurality of text strings 304 and a respective given parallel text string from the second plurality of text strings 306.

For example, the plurality of text string pairs 302 comprises a text string pair 308. In this example, the text string pair 308 comprises (i) a first text string 310 in the first language (e.g., English), and (ii) a second text string 312 in the second language (e.g., Russian). The first text string 310 may have been identified and extracted by the string alignment application 122 from the English version of a given web page, while the second text string 312 may have been identified and extracted by the string alignment application 122 from the Russian version of the given web page.

It is contemplated that the string alignment application 122 may also be configured to determine that the second text string 312 is a Russian translation of the first text string 310, and/or vice versa. Hence, it can be said that the string alignment application 122 may also be configured to determine that the second text string 312 is a parallel text string to the first text string 310, and/or vice versa. Put another way, it can be said that the text string pair 308 has the first text string 310 in the first language and a parallel text string in the second language which is the second text string 312.

In some embodiments of the present technology, the string alignment application 122 may also be configured to label each one of the plurality of text string pairs 302 with information indicative of a context in which the respective text strings have occurred in the respective versions of the given web page.

In one example, a first set of text string pairs 320 from the plurality of text string pairs 302 may be labeled with information indicative of that text strings in the first set of text string pairs 320 have occurred in a first context. For instance, let it be assumed that the first set of text string pairs 320 have been extracted from body content of web pages and, therefore, occurred in the body context.

In another example, a second set of text string pairs 330 from the plurality of text string pairs 302 may be labeled with information indicative of that text strings in the second set of text string pairs 330 have occurred in a second context. For instance, let it be assumed that the second set of text string pairs 330 have been extracted from title content of web pages and, therefore, occurred in the title context (as opposed to the first set of text string pairs 320 that occurred in the body context).

In a further example, a third set of text string pairs 340 from the plurality of text string pairs 302 may be labeled with information indicative of that text strings in the third set of text string pairs 340 have occurred in a third context. For instance, let it be assumed that the third set of text string pairs 340 have been extracted from navigation control content of web pages and, therefore, occurred in the navigation control context (as opposed to (i) the first set of text string pairs 320 that occurred in the body context, and (ii) the second set of text string 330 that occurred in the title context).

Figure 3:
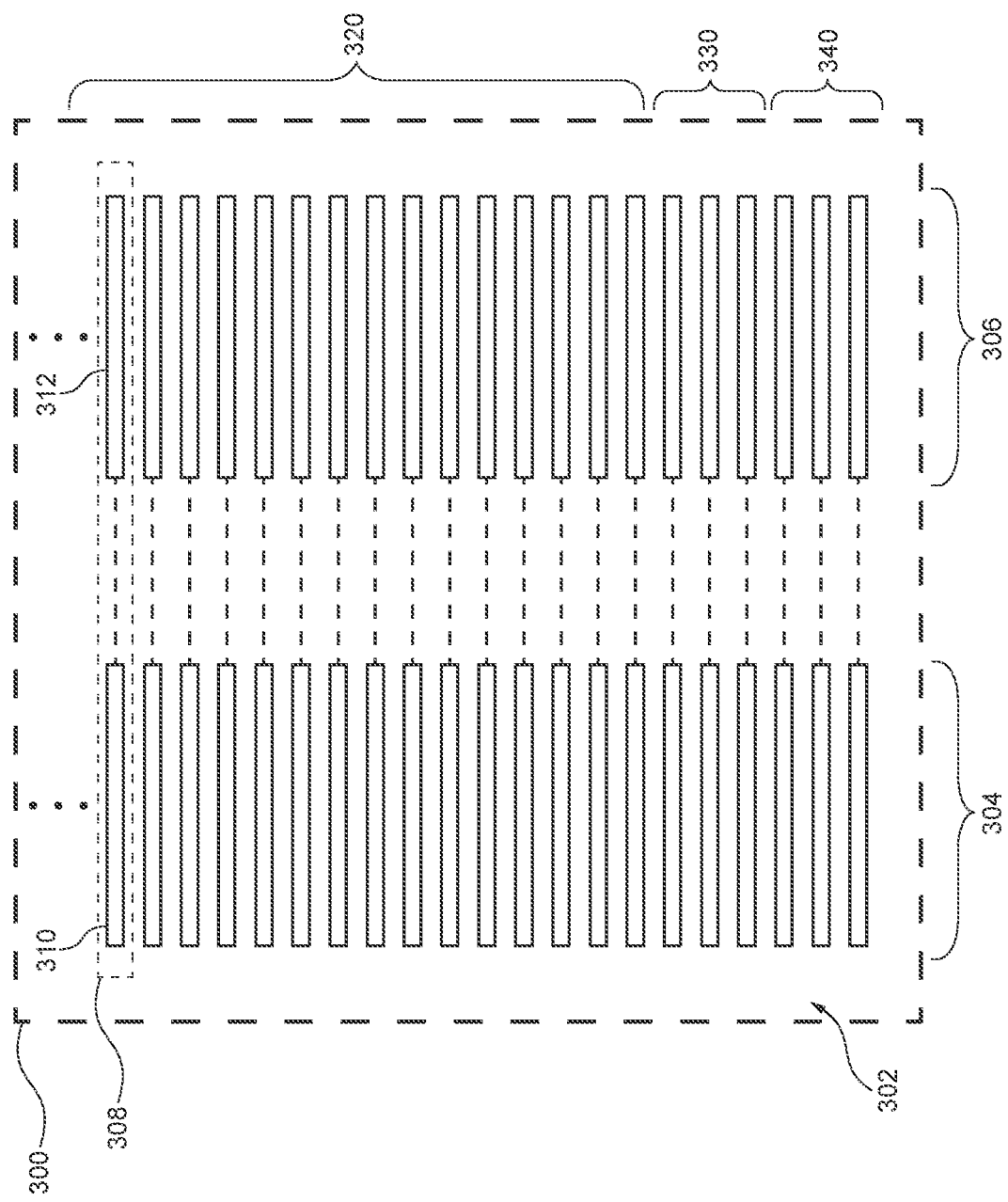
FIG. 3 depicts a corpus of text string pairs for a given pair of languages in accordance with non-limiting embodiments of the present technology

As illustrated in FIG. 3, it should be noted that the first set of text string pairs 320 comprises a larger number of text string pairs than (i) the second set of text string pairs 330, and (ii) the third set of text string pairs 340.

As previously mentioned, the majority of content of a given web page typically occurs in the body content of the given web page. Therefore, by processing content of a large number of web pages via the string alignment application 122, it is "natural" to have a larger number of text string pairs in the plurality of text string pairs 302 that are associated with the body context, if compared to a number of text string pairs in the plurality of text string pairs 302 that have occurred in any other context, such as the title context or the navigation control context, for example.

Therefore, it can be said that each one of the plurality of text string pairs 302 may be associated with a respective context from a plurality of contexts. This plurality of contexts comprises (i) a main context, and (ii) at least one auxiliary context. In the non-limiting example of network resources being web pages, the main context is the body context, while the at least one auxiliary context are the title context and the navigation control context (it is contemplated that the footer context and the header context may be part of the at least one auxiliary context).

In addition, it can also be said that the plurality of text string pairs 302 comprises a "natural proportion" of text string pairs of each context. In the context of the present specification, a "natural proportion" refers to a proportion of text string pairs of each context that typically occur on network resources. In the non-limiting example of network resources being web pages, by "natural proportion" of text string pairs of each context we mean the proportion of text string pairs of each context that typically occurs on web pages.

As explained above, a large portion (if not the majority) of content of a given web page typically occurs in the body context. Therefore, in some embodiments, the plurality of text string pairs 302 comprising a natural proportion of text string pairs of each context means that the plurality of text string pairs 302 comprises a large portion of text string pairs having occurred in the main context (e.g., body context). In other embodiments, the plurality of text string pairs 302 comprising a natural proportion of text string pairs of each context means that the plurality of text string pairs 302 comprises a larger number of text string pairs having occurred in the main context (e.g., body context) if compared to a number of text string pairs having occurred in any given auxiliary context (e.g., title context or navigation control context).

It is contemplated that, in some embodiments of the present technology, the server 106 may store the corpus 300 in the database 108. Alternatively, the corpus 300 may be continuously supplemented, or supplemented at predetermined periods of time, with additional text string pairs extracted by the string alignment application 122.

Optionally, the server 106 may store corpuses for other language pairs than the English-Russian pair in addition to the corpus 300 in the database 108. For example, if the translation services of the system 100 are designed to provide translation services amongst 50 different languages, the database 108 may store a number of corpuses corresponding to a number of all possible language pairs amongst the 50 different languages. As explained above, each corpus stored in the database 108 may be built in a similar manner to how the corpus 300 is built.

Machine Learning Algorithm

Returning to the description of FIG. 1, the server 106 is also configured to execute a Machine Learning Algorithm (MLA) 124. Generally speaking, MLAs can learn from training samples and make predictions on new (unseen) data. The MLAs are usually used to first build a model based on training inputs of data in order to then make data-driven predictions or decisions expressed as outputs, rather than following static computer-readable instructions.

The MLAs are commonly used as estimation models, ranking models, classification models and the like. It should be understood that different types of the MLAs having different structures or topologies may be used for various tasks.

One particular type of MLAs includes Neural Networks (NNs). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than trying to determine complex statistical arrangements or mathematical algorithms for a given situation; the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers, automatic text translation into different languages, data processing, including filtering, clustering, vector embedding, and the like.

To summarize, the implementation of the MLA 124 by the server 112 can be broadly categorized into two phases—a training phase and an in-use phase. First, the given MLA is trained in the training phase. Then, once the given MLA knows what data to expect as inputs and what data to provide as outputs, the given MLA is actually run using in-use data in the in-use phase.

However, as it will become apparent from the description below, in some embodiments of the present technology, the implementation of the MLA 124 by the server 112 can be broadly categorized into three phases—a first training phase, a second training phase (or re-training phase), and an in-use phase.

Figure 4:
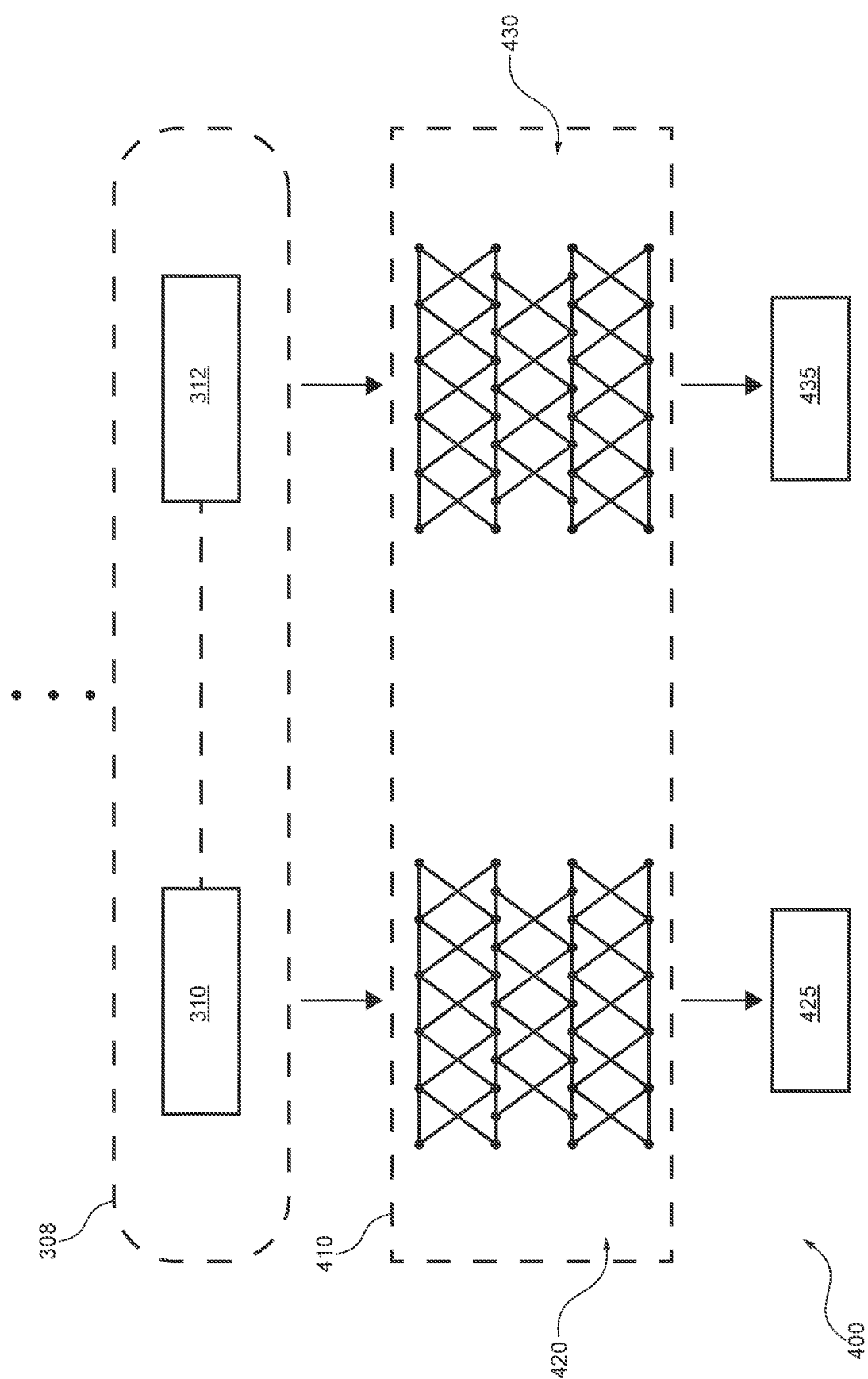
FIG. 4 depicts an example of an MLA trained for translating text strings from a first language to a second language in accordance with non-limiting embodiments of the present technology.

As previously alluded to, the MLA 124 may be implemented as a given NN. With reference to FIG. 4, there is depicted a schematic representation 400 of a given training iteration of a NN 410. It is contemplated that in some embodiments of the present technology, the MLA 124 may be implemented as the NN 410.

It should be understood that the first training phase of the NN 410 may comprise a very large number of training iterations that are executed similarly to the given training iteration of the NN 410. Also, it should be noted that the given training iteration of the NN 410, which will now be described, is a one of many iterations performed during the first training phase thereof.

Training Iteration During the First Training Phase

The NN 410 comprises an encoder portion 420 and a decoder portion 430. NNs with encoder-decoder architectures may be used for translation purposes. For example, the encoder portion 420 and the decoder portion 430 may each be Recurrent NN (RNN) or Convolutional NN (CNN). It is also contemplated that the encoder portion 420 and the decoder portion 430 may have hierarchical structures/topologies without departing from the scope of the present technology.

Broadly speaking, the given training iteration of the NN 410 during the first training phase is conducted based on a given training text string pair. In the non-limiting example of FIG. 4, the given training text string pair may correspond to the text string pair 308 of the corpus 300 depicted in FIG. 3. Other training iterations of the NN 410 may be conducted based on other text string pairs from the corpus 300. Therefore, it can be said that the NN 410 may be trained based on the plurality of text string pairs from the corpus 300.

During the given training iteration depicted in FIG. 4, the first text string 310 (a first training text string of the training text string pair) is transformed into a sequence of "tokens" that is inputted into the encoder portion 420. Therefore, it can be said that the training input for the encoder portion 420 is based on the first text string 310.

The encoder portion 420 is configured to encode the data representative of the training input (e.g., the sequence of "tokens" indicative of the first text string 310) and thereby generate an encoder output 425. The encoder output 425 is, in a sense, a "thought vector" of the encoder portion 420 for the training input, which is a hidden representation of the training input that has been encoded by the encoder portion 420.

Additionally, during the given training iteration depicted in FIG. 4, the second text string 312 (a second training text string of the training text string pair) is transformed into a sequence of "tokens" that is inputted into the decoder portion 430. Therefore, it can be said that the training input for the decoder portion 430 is based on the second text string 312 (parallel text string to a text string used by the encoder portion 420 during the given training iteration).

Similarly to what has been described above for the encoder portion 420, the decoder portion 430 is configured to encode the data representative of the training input (e.g., the sequence of "tokens" indicative of the second text string 312) and thereby generate a decoder output 435. The decoder output 435 is, in a sense, a "thought vector" of the decoder portion 430 for the training input, which is a hidden representation of the training input that has been encoded by the decoder portion 430.

The purpose of training the NN 410 is to condition, for a given training text string pair (for given parallel training text strings), (i) the encoder portion 420 to generate the encoder output 425, and (ii) the decoder portion 430 to generate the decoder output 435, such that the similarity between (i) the encoder output 425 and (ii) the decoder output 435 is maximized. This may be achieved, for example, by employing during training iterations of the NN 410, a variety of known techniques for adjusting interconnections between "neurons" of the encoder portion 420 and of the decoder portion 430 based on a similarity comparison between the encoder output 425 and the decoder output 435. In other words, they are conditioned to generate similar "hidden" outputs for the same phrase in different languages. For example, back propagation methods and/or various penalty functions may be applied onto the NN 410 for adjusting the interconnections between "neurons" of the encoder portion 420 and of the decoder portion 430 based on a similarity comparison between the encoder output 425 and the decoder output 435.

It should be appreciated that, if the encoder output 425 and the decoder output 435 are similar, this means that the encoder portion 420 may (i) receive an input based on the first text string 310, (ii) may generate a given encoder output, (iii) the given encoder output may be fed into the decoder portion 430 for decoding the given encoder input, and (iv) as a result, may provide a given text string that is similar to the second text string 312.

Recalling that the second text string 312 is a parallel text string in Russian of the first text string 310 which is in English, this means that conditioning the encoder portion 420 and the decoder portion 430 to generate the encoder output 425 and the decoder output 435, respectively, such that their similarity is maximized may allow the use of the trained NN 410 for translating text strings from a first language to a second language. It is contemplated that, during the first training phase, a large number of training iterations may be performed for conditioning the encoder portion 420 and the decoder portion 430 similarly to how the given training iteration is performed based on the text string pair 308 (a given training text string pair).

It should be understood that the NN 410 may be trained for translating text strings between language pairs other than the English-Russian pair. This may be achieved by using another corpus that is similar to the corpus 300 but which comprises text string pairs for a language pair other than the English-Russian pair. It should also be understood that additional techniques may be used for translating text strings by the NN 410, such as "attention" type mechanisms, for example, without departing from the scope of the present technology.

In summary, the MLA 124 (such as the NN 410, for example) may be trained, during a the first training phase thereof, using a first plurality of training string pairs, such as the plurality of string pairs 302 of the corpus 300, for determining a given parallel text string in the second language (e.g., Russian) in response to a respective text string in the first language (e.g., English).

It should be recalled that the plurality of text string pairs 302, which can be used as the first plurality of training string pairs during the first training phase, comprises a natural proportion of text string pairs of each context (e.g., the large portion of training text string pairs have occurred in the main/body context). Put another way, the first plurality of training string pairs, based on which the MLA 124 (e.g., the NN 410) is trained during the first training phase, comprises a natural proportion of training string pairs of each context.

It is contemplated that training the MLA 124 (e.g., the NN 410) during the first training phase, as described above, may result in the MLA 124 generating good translation from a first language to a second language. Indeed, the MLA 124 trained during the first training phase, as described above, may be used for enabling translation services of the system 100 in some embodiments of the present technology.

However, the developers of the present technology have realized that training the MLA 124 during the first training phase, as described above, may also result in the MLA 124 being biased to generate a given parallel text string as a translation of the respective text string as if it occurred in the main/body context (i.e. in the main content).

Returning to the example of the word "Home" mentioned above, the word "Home" used in a body context (e.g., main context in the case of web pages) could mean or refer to living quarters, whereas the word "Home" used in a navigation control context (e.g., a given auxiliary context in the case of web pages) could mean or refer to a home page or main page of a website. Hence, training the MLA 124 during the first training phase, as described above, may result in the MLA 124 being biased to generate a given parallel word as a translation of the word "Home" having occurred in the body context—that is, the MLA 124 may be biased to translate the word "Home" as meaning living quarters, irrespective of whether or not the word "Home" was actually used in another context than the main/body context of a given web page.

To better illustrate this, reference will now be made to FIGS. 1 and 5.

Let it be assumed that the electronic device 104 is displaying the browser window 502 of the browser application 105 in accordance with the representation 500. As mentioned above, the display pane 506 is displaying some content of the desired network resource to the user 102 (e.g., desired web page). More specifically, the display pane 506 is displaying:

navigation control content 520 comprising "Home", "Page 1", and "Page 2";

title content 530 comprising "HOUSING MARKET: OWNING A HOME MORE EXPENSIVE THAN EVER"; and at least a portion of body content 540 comprising "A family home is more than just a place to live in. It allows creating an atmosphere of comfort and love".

It should be noted that in this non-limiting example, the word "Home" is included in each one of the navigation control content 520, the title content 530 and the at least the portion of bode content 540.

Let it be assumed that, in this case, English is a foreign language for the user 102. In other words, the user 102 may not be able to understand the navigation control content 520, the title content 530 and the at least the portion of bode content 540 that is being displayed thereto. As such the user 102 may actuate the translation button 514 for translating the content displayed thereto.

It is contemplated that in some embodiments of the present technology, the browser application 105 may be configured to identify content being currently displayed to the user 102. For example, the browser application 105 may be configured to identify text strings that are rendered and currently displayed to the user 102 within the navigation control content 520, the title content 530 and the at least the portion of bode content 540.

This means that, in this non-limiting example, the browser application 105 may identify text strings "Home", "Page 1", "Page 2", "HOUSING MARKET: OWNING A HOME MORE EXPENSIVE THAN EVER", and "A family home is more than just a place to live in. It allows creating an atmosphere of comfort and love".

It is contemplated that the browser application 105 may be configured to trigger the electronic device 104 to generate the server request 160 (see FIG. 1). The server request 160 may take form of one or more data packets that comprise information indicative of the identified text strings (that are rendered and currently displayed to the user 102). The electronic device 104 may transmit the server request 160 to the server 106 via the communication network 110.

The server 106 may be configured to transmit the identified text strings received via the server request 160 to the MLA 124 having been trained during the first training phase as explained above. Put another way, the server 106 may employ the MLA 124 having been trained, via the first training phase described above, during its in-use phase for translating the identified text strings received by the server request 160.

As a result, the MLA 124 having been trained via the first training phase thereof, as explained above, may generate:

for "Home", a parallel word "Дом";
for "Page 1", a parallel word "Страница 1";
for "Page 2", a parallel word "Страница 2";

for "HOUSING MARKET: OWNING A HOME MORE EXPENSIVE THAN EVER", a parallel title "РЫНОК ЖИЛЬЯ : ВЛАДЕТЬ ДОМОМ - ДОРОЖЕ, ЧЕМ КОГДА - ЛИБО";

for "A family home is more than just a place to live in. It allows creating an atmosphere of comfort and love", parallel sentences "Семейный дом - это больше, чем просто место для проживания. Он позволяет создать атмосферу комфорта и любви.".

The server 106 may retrieve the above parallel text strings generated by the MLA 124 and generate the server response 165. The server response 165 may take form of one or more data packets that comprise information indicative of the generated parallel texts strings retrieved from the MLA 124. The server 106 may transmit the server response 165 to the electronic device 104 via the communication network 110.

The electronic device 104 may be configured to transmit the generated parallel texts strings received via the server response 165 to the browser application 105. The browser application 105 is configured to replace/substitute the identified text strings (that have been rendered and displayed to the user 102) with the corresponding generated parallel texts strings received via the server response 165.

Once the browser application 105 has replaced/substituted the identified text strings with the corresponding generated parallel texts strings, the electronic device 104 may be configured to display the browser window 502 of the browser application 105 in accordance with a representation 590 depicted in a middle portion of FIG. 5.

As illustrated, the browser application 105 may be configured to display (i) a translated navigation control content 521 instead of the navigation control content 520, (ii) a translated title content 530' instead of the title content 530, and (iii) a translated body content 541 instead of the at least the portion of the body content 540.

As mentioned above, the displayed translated content of the representation 590 is a good translation of the displayed content of the representation 500. Such a translation of the displayed content of the representation 500 may allow the user 102 to understand a large portion of the content displayed thereto.

However, it is contemplated that, in some embodiments of the present technology, the displayed translated content of the representation 590 may not be the correct/best translation of the displayed content of the representation 500. As one example, the word "Home", which is included in each one of (i) the navigation control content 520, (ii) the title content 530 and (ii) the body content 540, is translated as the word "Дом" in each one of (i) the translated navigation control content 521, (ii) the translated title content 530' (actually translated as "Домом" which is a declension (case, to be more specific) of the word "Дом" in Russian), and (iii) the translated body content 540'.

It should be appreciated that the word "Дом" in Russian refers to living quarters. Put another way, the word "Дом" is a correct/best translation of the word "Home" that occurred in the body context (e.g., in the body content 540). The word "Дом" is not a correct/best translation of the word "Home" that occurred in the navigation control context (e.g., in the navigation control content 520). The word "Дом" (actually the declension "Домом") also is not a correct/best translation of the word "Home" that occurred in the title context (e.g., in the title content 530).

As mentioned above, in this example, the less desirable translations of the word "Home" in the translated navigation control content 521 and in the translated title content 531 may be due to the MLA 124 having been trained, during the first training phase, based on the first plurality of training text string pairs having a natural proportion of training text string pairs of each context.

Put another way, due to the natural proportion of training text strings of each context, which have been used to train the MLA 124 during the first training phase, the MLA 124 is biased to generate the word "*Дом*" as a translation of the word "Home" having occurred in the body context (e.g., as referring to living quarters and not as referring to a main web page, for example). Indeed, a large portion of training examples provided to the MLA 124 during the first training phase are indicative of the word "*Дом*" being the correct/best translation of the word "Home" and, thus, the MLA 124 is biased to translate, during in-use, the word "Home" as the word "*Дом*".

It can be said that the first training phase of the MLA 124 is context agnostic, in the sense that the context in which the training examples have occurred is not taken into account/considered by the MLA 124 during the first training phase thereof.

The developers of the present technology have devised methods and systems for at least reducing the above-mentioned bias of the MLA 124. The developers of the present technology have realized that the above-mentioned bias of the MLA 124 (e.g., the NN 410) may be corrected or at least reduced by further training (or re-training) the MLA 124 based on a second set of training text string pairs that comprises a controlled proportion, as opposed to the natural proportion, of text string pairs of each context.

It is contemplated that in some embodiments of the present technology, the above-mentioned bias of the MLA 124 (e.g., the NN 410) may be corrected or at least reduced by performing the second training phase of the MLA 124, as mentioned above, by using the second set of training text string pairs that comprises the controlled proportion of text string pairs of each context.

How the second set of training text string pairs is determined and how the second training phase of the MLA 124 may be performed to correct or at least reduce the above-mentioned bias of the MLA 124 will now be discussed in turn.

The Second Training Phase of the MLA

As mentioned above, during the second training phase of the MLA 124, the second set of training text string pairs is used, instead of the first set of training text string pairs. In other words, during the second training phase, a given set of text string pairs having a controlled proportion of text string pairs of each context is used, instead of a given set of text string pairs having a natural proportion of text string pairs of each context.

During the second training phase, the server 106 may be configured to train the MLA 124 based on a similar number of text string pairs of each context. For example, the second set of training text strings may include 1000 training text string pairs of the main context. As such, the second set of training text strings may include approximately 1000 training text strings of each one of the at least one auxiliary context.

Therefore, it can be said that the server 106 may determine the second set of training text string pairs by controlling the proportion of text string pairs of each context that is selected from the corpus 300 for training (re-training) the MLA 124 during the second training phase.

The second set of training text string pairs may be determined by the server 106 based on the plurality of text string pairs 302. However, the server 106 may be configured to control which ones of the plurality of text string pairs 302 are to be included into the second set of training text string pairs based on their respective contexts so that the second set of training text string pairs has a controlled proportion of text string pairs of each context.

To better understand the difference between the first training phase and the second training phase of the MLA 124, it should be noted that the server 106 trained the MLA 124 during the first training phase to, in a sense, "learn", possibly from scratch, how to translate a text string into a parallel text string. This may be a difficult task to achieve if only a small number of training examples are used.

For that reason, during the first training phase of the MLA 124, the MLA 124 is fed with a large number of training examples (the first set of training text string pairs may possibly include all of the plurality of text string pairs 302 from the corpus 300), so that the MLA 124 "learns" how to translate based on a large variety of training examples.

By the moment in time when the second training phase of the MLA 124 begins, the MLA 124 has already been sufficiently trained to generate good translations. As such, during the second training phase, as opposed to the first training phase, the goal per se is not to feed a large number of training examples to the MLA 124, but rather controlling which training examples are fed to the MLA 124 to potentially correct some of the biases of the MLA 124 acquired as a result of the natural proportion of training examples used during the first training phase.

In some embodiments of the present technology, it is also contemplated that the second set of training text string pairs used during the second training phase may include at least some training text string pairs from first training text string pairs.

In other embodiments of the present technology, the training text string pairs may be fed to the MLA 124 during the second training phase by the server 106 in a controlled manner. In other words, the server 106 may feed the MLA 124, during the second training phase, training text string pairs in a controlled order which preserves the controlled proportion of text string pairs of each context.

It is contemplated that in some embodiments, it might be advantageous to feed the MLA 124 during the second training phase with training text string pairs in a controlled order since it allows interrupting, restarting and/or ending the second training phase at any moment in time while still preserving the controlled proportion of text string pairs of each context that are fed to the MLA 124 during the second training phase.

It should be recalled that during the building of the corpus 300, the string alignment application 122 may be configured to label each one of the plurality of text string pairs 302 with information indicative of a context in which the respective text strings have occurred in the respective versions of the given web page.

As mentioned above:
  the first set of text string pairs 320 from the plurality of text string pairs 302 has been labeled with information indicative of that text strings in the first set of text string pairs 320 have occurred in the body context;
  the second set of text string pairs 330 from the plurality of text string pairs 302 has been labeled with information indicative of that text strings in the second set of text string pairs 330 have occurred in the title context; and
  the third set of text string pairs 340 from the plurality of text string pairs 302 has been labeled with information indicative of that text strings in the third set of text string pairs 340 have occurred in the navigation control context.

In some embodiments of the present technology, it is contemplated that the server 106 may feed the MLA 124 with training text strings, not only in a controlled proportion of training text strings of each context, but also in combination with the respective labels. Put another way, not only that the server 106 is configured to control, based on the respective contexts, the proportions of training examples that are fed into the MLA 124 during the second training phase, but the server 106 may also be configured to feed the MLA 124 with the respective label of each training example used during the second training phase.

In some embodiments of the present technology, feeding the MLA 124 training examples during the second training phase in association with respective labels, may allow the MLA 124 to, in a sense, "learn" to correlate some textual features of a given text string to the context in which the given text string occurs in order to generate a correct/best parallel text string. Put in other words, during in-use, the MLA 124 may be configured to determine a given in-use context of a given in-use text string based on textual features of the given in-use context and generate a respective in-use parallel text string as a translation of the given in-use text string having considered the given in-use context.

Training the MLA 124 during the second training phase as described above may correct or at least reduce the above-mentioned bias of the MLA 124. To better illustrate this, reference will now be made to FIGS. 1 and 5.

As previously mentioned, the browser application 105 may identify text strings "Home", "Page 1", "Page 2", "HOUSING MARKET: OWNING A HOME MORE EXPENSIVE THAN EVER", and "A family home is more than just a place to live in. It allows creating an atmosphere of comfort and love" and may transmit them via the server request 160. The server 106 may also be configured to transmit the identified text strings received via the server request 160 to the MLA 124.

However, in some embodiments of the present technology, by the moment in time when the MLA 124 receives the identified text strings, the MLA 124 may have been trained via both the first training phase and the second training phase (re-trained), as explained above. In other words, the in-use phase of the MLA 124, in this example, during which the MLA 124 is employed to translate the identified text strings, the server 106 may have already completed both the first and the second training phases of the MLA 124.

As a result, the MLA 124 having been trained during the first training phase and during the second training phase (re-trained), as explained above, may generate:

for "Home", a parallel word "*Главная*";
for "Page 1", a parallel word "*Страница 1*";
for "Page 2", a parallel word "*Страница 2*";
for "HOUSING MARKET: OWNING A HOME MORE EXPENSIVE THAN EVER", a parallel title "*РЫНОК ЖИЛЬЯ : ВЛАДЕТЬ ЖИЛЬЕМ - ДОРОЖЕ , ЧЕМ КОГДА - ЛИБО*";
for "A family home is more than just a place to live in. It allows creating an atmosphere of comfort and love", parallel sentences "*Семейный дом - это больше, чем просто место для проживания . Он позволяет создать атмосферу комфорта и любви .*".

The electronic device 104 may be configured to display the browser window 502 of the browser application 105 in accordance with a representation 595 depicted in a bottom portion of FIG. 5 based on the generated parallel text strings by the MLA 124 having been re-trained, similarly to how the electronic device 104 is configured to display the browser window 502 of the browser application 105 in accordance with the representation 595, as explained above.

As illustrated, the browser application 105 may be configured to display (i) a translated navigation control content 522 instead of the navigation control content 520, (ii) a translated title content 532 instead of the title content 530, and (iii) a translated body content 542 instead of the at least the portion of the body content 540.

It should be noted that:

as opposed to the translated content of the representation 590, where the word "Home" has been translated into the word "*Дом*" in each one of (i) the translated navigation control content 521, (ii) the translated title content 531 (actually translated into "*Домом*"), and (iii) the translated body content 541, in the translated content of the representation 595, the word "Home" is translated into different parallel words in each one of (i) the translated navigation control content 522, (ii) the translated title content 532, and (iii) the translated body content 542.

For example, in the translated navigation control content 522, the parallel word to "Home" is "*Главная*". It should be appreciated that the word "*Главная*" in Russian means "Main", which is a correct/best translation of the word "Home" in the navigation control context.

In another example, in the translated title content 532, the parallel word to "HOME" is "*ЖИЛЬЕМ*". It should be appreciated that the word "*ЖИЛЬЕ*" in Russian means "HOUSING", which is a correct/best translation of the word "HOME" in the title context.

In a further example, in the translated body content 542, the parallel word to "home" is "*дом*". It should be appreciated that the translation of the word "home" in the body context has not changed despite the re-training of the MLA 124 during the second training phase thereof.

In some embodiments of the present technology, it may be desirable to limit the adaption of the MLA 124 from its trained state following the first training phase via the second training phase thereof. The first training phase may enable to MLA 124 to provide correct/best translation for content occurring in the main context (which is likely to be the large portion of content of a given network resource) and good translations of other content occurring in the at least one auxiliary context. As a result, the purpose of the second training phase is not to completely re-train the MLA 124, but rather to "adjust" the MLA 124 having been trained during the first training phase in order to consider contexts in which content may be used.

To that end, in some embodiments of the present technology, different adaptation-limiting techniques may be envisioned for limiting the "adjustment" of the MLA 124 in response to the second training phase. It is contemplated that limiting the adaptation or adjustment of the MLA 124 during the re-training phase (second training phase) may allow limiting the degradation of a quality of the translation of the given in-use text string having occurred in the main context (for example, in the translated body content 542, the parallel word to "home" is "*дом*", and therefore, the translation of the word "home" in the body context has not changed despite the re-training of the MLA 124 during the second training phase thereof).

In some embodiments, the server 104 may use an adaptation-limiting loss function, during the second training phase of the MLA 124. The adaptation-limiting loss function may be configured to limit the adaptation of the trained state of the MLA 124 (resulting from the first training phase) during the second training phase.

It is contemplated that using the adaptation-limiting loss function by the server 106, may include, during a given iteration of the second training phase, computing various distributions and similarity measures for a given text string or word.

For example, the server 106 may be configured to compute a teacher distribution for a given word during translation thereof by the MLA 124 trained only via the first training phase. The teacher distribution may be indicative of probabilities of respective potential parallel words being the translation of the given word as determined by the MLA 124 trained only via the first training phase.

For example, the server 106 may be configured to compute a student distribution for the given word during translation thereof by the MLA 124 as trained so far (via the first training phase and via potential training iteration of the second training phase having been performed so far). The student distribution may be indicative of probabilities of respective potential parallel words being the translation of the given word as determined by the MLA 124 as trained so far (via the first training phase and via potential training iteration of the second training phase having been performed so far).

Also, the server 106 may be configured to compute a cross-entropy value. The cross-entropy value may be a similarity measure between the student distribution and ground-truth distribution for the given word. The ground-truth distribution may be indicative of a correct/best translation of the given word occurred in the respective context.

Also, the server 106 may be configured to compute a divergence value. The divergence value may be a similarity measure between the teacher distribution and the student distribution.

Also, the server 106 may be configured to compute a weighted sum of the cross-entropy value and of the divergence value. The weighted sum may be a value of the adaptation-limiting loss function for the given word of the given training iteration of the second training phase of the MLA 124. As mentioned above, this adaptation-limiting loss function may be used to limit the adaptation of the trained state of the MLA 124, having resulted from the first training phase, during the given training iteration of the second training phase.

Figure 6:
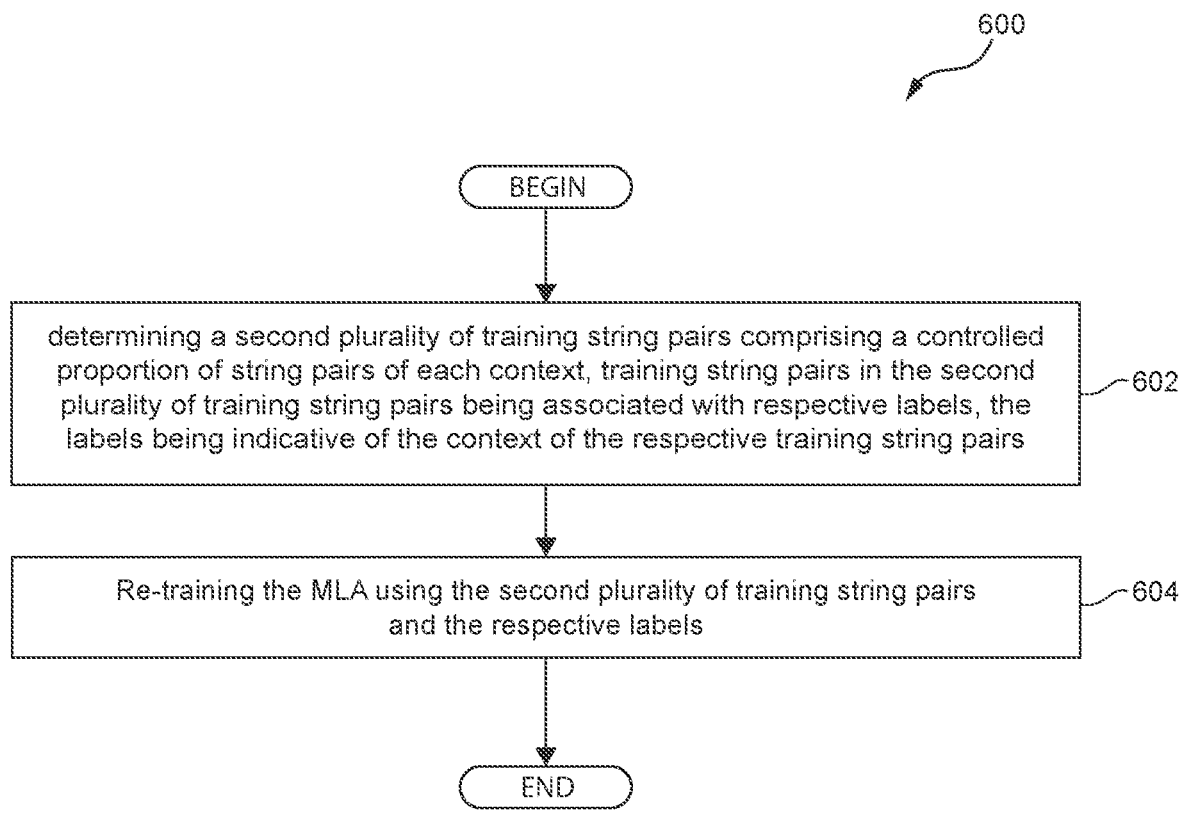
FIG. 6 is a schematic block diagram of a flow chart of a method for training the MLA of FIG. 4 in accordance with non-limiting embodiments of the present technology.

In some embodiments of the present technology, the server 106 may be configured to execute a method 600, depicted in FIG. 6, for training (re-training) the MLA 124 for translating a given text string in a first language into a given parallel text string in a second language. The method 600 will now be described.

STEP 602: Determining a Second Plurality of Training String Pairs Comprising a Controlled Proportion of String Pairs of Each Context The method 600 begins at step 602 with the server 106 determining a second plurality of training string pairs that comprises a controlled proportion of string pairs of each context. It should be noted that the second plurality of training string pairs determined during the step 602 can be used during the second training phase (or re-training phase of the MLA 124).

As mentioned above, during the second training phase of the MLA 124, the second set of training text string pairs is used, instead of the first set of training text string pairs. In other words, during the second training phase, a given set of text string pairs having a controlled proportion of text string pairs of each context is used, instead of a given set of text string pairs having a natural proportion of text string pairs of each context.

In some embodiments, the natural proportion of string pairs of each context corresponds to proportion of string pairs of each context available from the plurality of network resources 112 accessible via the communication network 110.

During the second training phase, the server 106 may be configured to train the MLA 124 based on a similar number of text string pairs of each context. For example, the second set of training text strings may include 1000 training text string pairs of the main context. As such, the second set of training text strings may include approximately 1000 training text strings of each one of the at least one auxiliary context.

Therefore, it can be said that the server 106 may determine the second set of training text string pairs by controlling the proportion of text string pairs of each context that is selected from the corpus 300 for training (re-training) the MLA 124 during the second training phase.

The second set of training text string pairs may be determined by the server 106 based on the plurality of text string pairs 302. However, the server 106 may be configured to control which ones of the plurality of text string pairs 302 are to be included into the second set of training text string pairs based on their respective contexts so that the second set of training text string pairs has a controlled proportion of text string pairs of each context.

In some embodiments of the present technology, the string alignment application 122 of the server 106 may label each one of the plurality of text string pairs 302 with information indicative of a context in which the respective text strings have occurred in the respective versions of the given web page.

In one example, the first set of text string pairs 320 from the plurality of text string pairs 302 may be labeled with information indicative of that text strings in the first set of text string pairs 320 have occurred in a first context. For instance, let it be assumed that the first set of text string pairs 320 have been extracted from body content of web pages and, therefore, occurred in the body context.

In another example, the second set of text string pairs 330 from the plurality of text string pairs 302 may be labeled with information indicative of that text strings in the second set of text string pairs 330 have occurred in a second context. For instance, let it be assumed that the second set of text string pairs 330 have been extracted from title content of web pages and, therefore, occurred in the title context (as opposed to the first set of text string pairs 320 that occurred in the body context).

Therefore it is contemplated that the second plurality of training text string pairs that are used during the second training phase (re-training phase) are associated with respective labels that are indicative of the context of the respective training text string pairs.

STEP 604: Re-Training the MLA Using the Second Plurality of Training String Pairs and the Respective Labels The method 600 may end at step 604 with the server 106 being configured to re-train the MLA 124 using the second plurality of training string pairs and the respective labels. The MLA 124 is re-trained to determine a given in-use context of a given in-use text string and generate a respective in-use parallel text string as a translation of the given in-use text string having considered the given in-use context.

For example, the step 604 may correspond to the second training phase (or re-training phase) of the MLA 124 as explained above. Re-training the MLA 124 during the second training phase as described above may correct or at least reduce the above-mentioned bias of the MLA 124.

As mentioned above, it is contemplated that the server 106 may feed the MLA 124 with training text strings, not only in a controlled proportion of training text strings of each context, but also in combination with the respective labels. Put another way, not only that the server 106 is configured to control, based on the respective contexts, the proportions of training examples that are fed into the MLA 124 during the second training phase (during re-training), but the server 106 may also be configured to feed the MLA 124 with the respective label of each training example used during the second training phase.

In some embodiments of the present technology, feeding the MLA 124 training examples during the second training phase in association with respective labels, may allow the MLA 124 to, in a sense, "learn" to correlate some textual features of a given text string to the context in which the given text string occurs in order to generate a correct/best parallel text string. Put in other words, during in-use, the MLA 124 may be configured to determine a given in-use context of a given in-use text string based on textual features of the given in-use context and generate a respective in-use parallel text string as a translation of the given in-use text string having considered the given in-use context.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of training a Machine Learning Algorithm (MLA) for translating a text string in a first language into a parallel text string in a second language, the method being executable by a server implementing the MLA, the server having access to training string pairs each having (i) a given text string in the first language and (ii) a given parallel text string in the second language, the training string pairs having occurred in respective contexts, the contexts comprising a main context and at least one auxiliary context, the MLA having been trained using a first plurality of training string pairs for determining a given parallel text string in the second language in response to a respective text string in the first language, the first plurality of training string pairs comprising a natural proportion of string pairs of each context, the MLA being biased to generate the given parallel text string as a translation of the respective text string having occurred in the main context, the method comprising:

determining, by the server, a second plurality of training string pairs for training the MLA, the second plurality of training string pairs comprising a controlled proportion of string pairs of each context, training string pairs in the second plurality of training string pairs being associated with respective labels, the labels being indicative of the context of the respective training string pairs, wherein the controlled proportion comprises the substantially equal proportions of training string pairs occurring in the main context and in each one of the at least one auxiliary contexts; and re-training, by the server, the MLA using the second plurality of training string pairs and the respective labels, the MLA being re-trained to determine a given in-use context of a given in-use text string and generate a respective in-use parallel text string as a translation of the given in-use text string having considered the given in-use context.

2. The method of claim 1, wherein the natural proportion of string pairs of each context corresponds to proportion of string pairs of each context available from a plurality of network resources accessible via a communication network.

3. The method of claim 1, wherein a given training text string having occurred in the main context comprises body content of a given network resource, and wherein another given training text string having occurred in the at least one auxiliary context comprises at least one of:

footer content of the given network resource;
header content of the given network resource;
title content of the given network resource; and
navigation control content of the given network resource.

4. The method of claim 1, wherein the natural proportion comprises a majority of training string pairs in the first plurality of training string pairs occurring in the main context.

5. The method of claim 1, wherein the MLA comprises an encoder portion dedicated for text strings in the first language and a decoder portion dedicated for text strings in the second language, and wherein the re-training the MLA comprises:

training, by the server, the encoder portion to generate, for (i) a training text string in the first language of a given training string pair from the second plurality of training string pairs and (ii) a respective label, an encoder output;

training, by the server, the decoder portion to generate, for (i) a training parallel text string in the second language of the given training string pair from the second plurality of training string pairs and (ii) the respective label, an decoder output;

such that a similarity between the encoder output and of the decoder output is maximised.

6. The method of claim 1, wherein the method further comprises:

receiving, by the server, a first in-use text string in the first language, the first in-use text string comprising a given word;

receiving, by the server, a second in-use text string in the first language, the second in-use text string comprising the given word;

executing, by the server, the MLA for generating a first parallel in-use text string in the second language based on the first in-use text string, the given word being translated into a first parallel word in the first parallel in-use text string;

executing, by the server, the MLA for generating a second parallel in-use text string in the second language based on the second in-use text string, the given word being translated into a second parallel word in the second parallel in-use text string; and such that, if the MLA determines that the context of the first in-use text string is different from the context of the second in-use text string, the first parallel word and the second parallel word are different translations of the given word.

7. The method of claim 1, wherein the re-training the MLA comprises:

using, by the server, an adaptation-limiting loss function for re-training the MLA,
the adaptation-limiting loss function being configured to limit the adaptation of the MLA, which has been trained based on the first plurality of training string pairs, following the training of the MLA.

8. The method of claim 7, wherein limiting adaptation of the MLA comprises limiting degradation of a quality of the translation of the given in-use text string having occurred in the main context.

9. The method of claim 7, wherein the using the adaptation-limiting loss function comprises, during a given iteration of the re-training of the MLA:
computing, by the server, a teacher distribution for a given word during a translation by the MLA as trained before the re-training, the teacher distribution being indicative of probabilities of respective potential words being the translation of the given word as determined by the MLA as trained before the re-training;
computing, by the server, a student distribution for the given word during a translation by the MLA being re-trained, the student distribution being indicative of probabilities of respective potential words being the translation of the given word as determined by the MLA being re-trained during the given iteration;
computing, by the server, a cross-entropy value being a first type of similarity measure between the student distribution and a ground-truth distribution, the ground-truth distribution being indicative of a correct translation of the given word occurred in the respective context;
computing, by the server, a divergence value being a second type of similarity measure between the teacher distribution and the student distribution; and
computing, by the server, a weighted sum of the cross-entropy value and of the divergence value, the weighted sum being a value of the adaptation-limiting loss function for the given word of the given iteration.

10. A server for training a Machine Learning Algorithm (MLA) for translating a text string in a first language into a parallel text string in a second language, the MLA being implemented by the server, the server having access to training string pairs each having (i) a given text string in the first language and (ii) a given parallel text string in the second language, the training string pairs having occurred in respective contexts, the contexts comprising a main context and at least one auxiliary context and at least one auxiliary context,
the MLA having been trained using a first plurality of training string pairs for determining a given parallel text string in the second language in response to a respective text string in the first language, the first plurality of training string pairs comprising a natural proportion of string pairs of each context, the MLA being biased to generate the given parallel text string as a translation of the respective text string having occurred in the main context,
the server being configured to:
determine a second plurality of training string pairs for training the MLA, the second plurality of training string pairs comprising a controlled proportion of string pairs of each context, training string pairs in the second plurality of training string pairs being associated with respective labels, the labels being indicative of the context of the respective training string pairs, wherein the controlled proportion comprises the substantially equal proportions of training string pairs occurring in the main context and in each one of the at least one auxiliary contexts; and
re-train the MLA using the second plurality of training string pairs and the respective labels, the MLA being re-trained to determine a given in-use context of a given in-use text string and generate a respective in-use parallel text string as a translation of the given in-use text string having considered the given in-use context.

11. The server of claim 10, wherein the natural proportion of string pairs of each context corresponds to proportion of string pairs of each context available from a plurality of network resources accessible via a communication network.

12. The server of claim 10, wherein a given training text string having occurred in the main context comprises body content of a given network resource, and wherein another given training text string having occurred in the at least one auxiliary context comprises at least one of:
footer content of the given network resource;
header content of the given network resource;
title content of the given network resource; and
navigation control content of the given network resource.

13. The server of claim 10, wherein the natural proportion comprises a majority of training string pairs in the first plurality of training string pairs occurring in the main context.

14. The server of claim 10, wherein the MLA comprises an encoder portion dedicated for text strings in the first language and a decoder portion dedicated for text strings in the second language, and wherein to re-train the MLA the server is configured to:
train the encoder portion to generate, for (i) a training text string in the first language of a given training string pair from the second plurality of training string pairs and (ii) a respective label, an encoder output;
train the decoder portion to generate, for (i) a training parallel text string in the second language of the given training string pair from the second plurality of training string pairs and (ii) the respective label, an decoder output;
such that a similarity between the encoder output and of the decoder output is maximised.

15. The server of claim 10, wherein the server is further configured to:
receive a first in-use text string in the first language, the first in-use text string comprising a given word;
receive a second in-use text string in the first language, the second in-use text string comprising the given word;
execute the MLA for generating a first parallel in-use text string in the second language based on the first in-use text string, the given word being translated into a first parallel word in the first parallel in-use text string;
execute the MLA for generating a second parallel in-use text string in the second language based on the second in-use text string, the given word being translated into a second parallel word in the second parallel in-use text string; and
such that, if the MLA determines that the context of the first in-use text string is different from the context of the second in-use text string, the first parallel word and the second parallel word are different translations of the given word.

16. The server of claim 10, wherein to re-train the MLA the server is configured to:
use an adaptation-limiting loss function for re-training the MLA,
the adaptation-limiting loss function being configured to limit the adaptation of the MLA, which has been trained based on the first plurality of training string pairs, following the training of the MLA.

17. The server of claim 16, wherein limiting adaptation of the MLA comprises limiting degradation of a quality of the translation of the given in-use text string having occurred in the main context.

18. The server of claim 16, wherein to use the adaptation-limiting loss function, during a given iteration of the re-training of the MLA, the server is configured to:
- compute a teacher distribution for a given word during a translation by the MLA as trained before the re-training, the teacher distribution being indicative of probabilities of respective potential words being the translation of the given word as determined by the MLA as trained before the re-training;
- compute a student distribution for the given word during a translation by the MLA being re-trained, the student distribution being indicative of probabilities of respective potential words being the translation of the given word as determined by the MLA being re-trained during the given iteration;
- compute a cross-entropy value being a first type of similarity measure between the student distribution and a ground-truth distribution, the ground-truth distribution being indicative of a correct translation of the given word occurred in the respective context;
- compute a divergence value being a second type of similarity measure between the teacher distribution and the student distribution; and
- compute a weighted sum of the cross-entropy value and of the divergence value, the weighted sum being a value of the adaptation-limiting loss function for the given word of the given iteration.

\* \* \* \* \*